Sept. 5, 1961     J. O'BROCHTA     2,999,094
QUINOLINE SULFONATION PROCESS
Filed Oct. 19, 1959
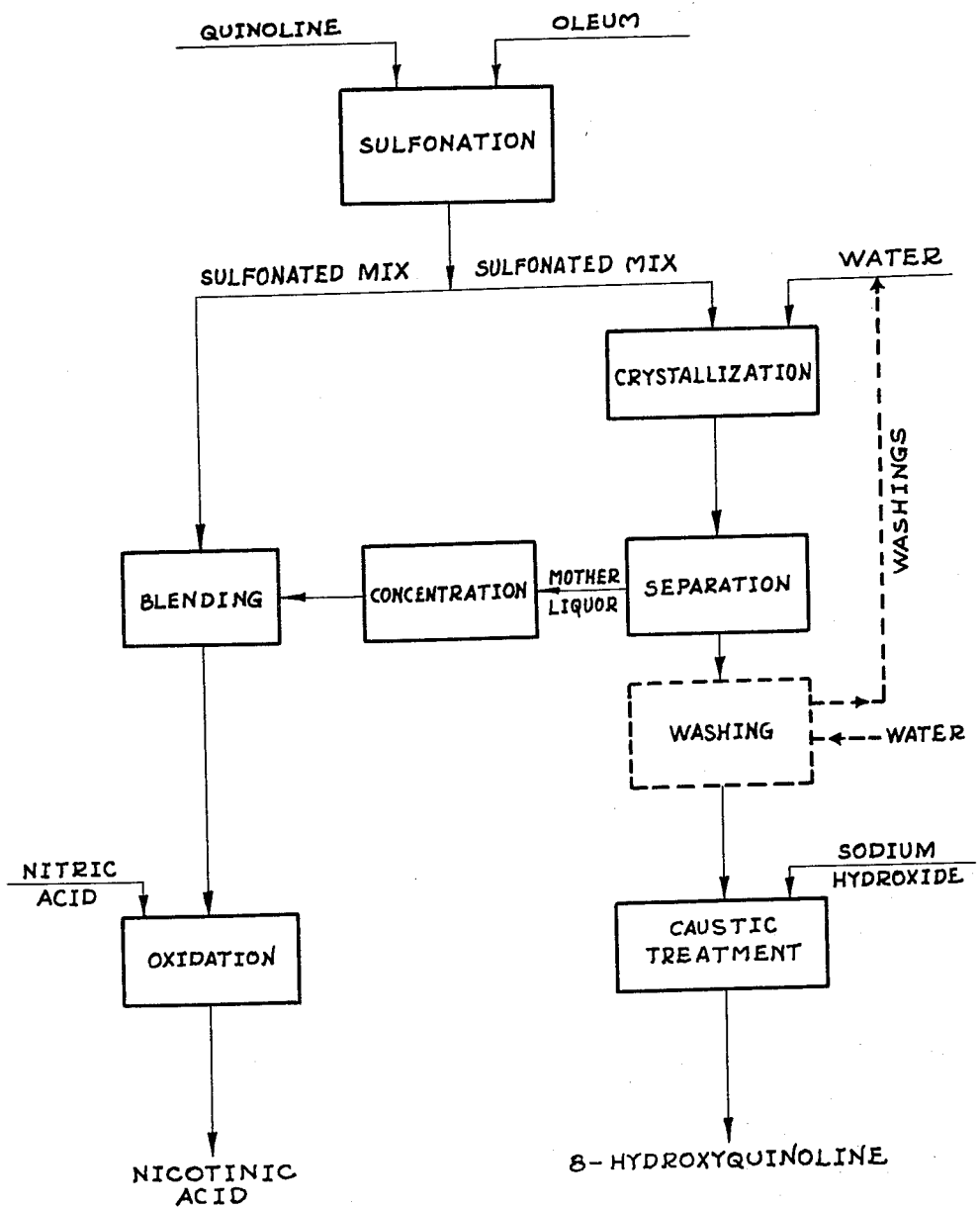
INVENTOR.
JOHN O'BROCHTA.
BY J.E. Armstrong
his ATTORNEY.

United States Patent Office 2,999,094
Patented Sept. 5, 1961

2,999,094
QUINOLINE SULFONATION PROCESS
John O'Brochta, Pittsburgh, Pa., assignor to Koppers Company, Inc., a corporation of Delaware
Filed Oct. 19, 1959, Ser. No. 847,398
3 Claims. (Cl. 260—289)

This invention relates to the sulfonation of quinoline. In one specific aspect, it relates to a novel integrated method for making two commercially desirable products, i.e. nicotinic acid and 8-hydroxyquinoline.

Nicotinic acid (Niacin) is a member of the vitamin B complex group and is extremely useful in the enrichment of foods to improve their nutritional values. 8-hydroxyquinoline is useful primarily in the preparation of its copper chelate, which is one of the most commercially important fungistats.

The art of making both nicotinic acid and 8-hydroxyquinoline by separate processes is well established. One process for making nicotinic acid comprises mixing sulfuric acid and quinoline, and reacting the quinoline sulfate thus formed with nitric acid at an elevated temperature. A process based on this reaction sequence is fully described in German Patent 912,216 (1954). 8-hydroxyquinoline is ordinarily made by the reaction of quinoline-8-sulfonic acid with sodium hydroxide. A method of carrying out this reaction is described in Grier et al., U.S. 2,489,530. An improved process for converting quinoline-8-sulfonic acid to 8-hydroxyquinoline is disclosed and claimed in my copending application S.N. 847,399. Although the use of my improved technique provides an efficient method for converting quinoline-8-sulfonic acid to 8-hydroxyquinoline, the overall yields of 8-hydroxyquinoline obtainable by any heretofore known process based on quinoline as a starting material do not exceed 70-90%, primarily because of the losses incurred in separating relatively pure quinoline-8-sulfonic acid from the crude acidic reaction product of quinoline and oleum. The reaction of quinoline and oleum produces a complex mixture of products including quinoline-8-sulfonic acid (the principal product), quioline sulfate, and some polysulfonated quinoline. It is very difficult to separate the last 10-30% of quinoline-8-sulfonic acid in uncontaminated form from the crude mixture. Moreover, the relative insolubility of quinoline sulfate makes it necessary to provide a substantial excess of acid during the sulfonation step. The solubility of quinoline sulfate in an excess of sulfuric acid is sufficiently high to avoid the formation of a solid phase within the reaction mixture, which would interfere with the reaction and prevent it from going to completion. Disposal of the large excess of acid required in the process creates a serious economic problem.

Quite surprisingly, I have discovered a novel integrated process for making nicotinic acid and 8-hydroxyquinoline in which the starting materials, quinoline and oleum, are consumed in substantially quantitative amounts. My novel process has the addtiional advantage of providing for the continuous sulfonation of quinoline.

It is, therefore, an object of the present invention to provide a method for making nicotinic acid and 8-hydroxyquinoline in a combined operation which is considerably more efficient from the standpoint of raw material consumption than any heretofore known method. It is a further object to provide a new technique for the continuous sulfonation of quinoline.

In accordance with the invention, a feed of quinoline and oleum of high $SO_3$ concentration is continuously supplied to a reaction zone. The weight ratio of oleum to quinoline supplied to the zone is at least about 2:1. The reaction temperature is maintained at about 120-180° C. and a sulfonated mix comprising a solution of sulfonated quinoline in sulfuric acid is continuously withdrawn from the zone at a rate sufficient to provide an average residence time for the feed materials of 1-6 hours. The sulfonated mix is divided into two portions representing from about 30-50 and 50-70% by weight of the mix. To one of the portions a quantity of water, at least equal to the weight of the portion, is added, thereby precipitating quinoline-8-sulfonic acid therefrom. The quinoline-8-sulfonic acid is separated from its mother liquor and treated with sodium hydroxide according to known methods or preferably the method described in my copending application S.N. 847,399 to form 8-hydroxyquinoline. 8-hydroxyquinoline is thereafter recovered by conventional means as one of the co-products of the method of the invention. The mother liquor from which the quinoline-8-sulfonic acid is separated is concentrated. The concentrate is blended with the other portion of the sulfonation mix to form a solution of sulfonated quinoline in sulfuric acid containing between about 10-30% by weight sulfonated quinoline. This solution is oxidized by conventional means, preferably by the use of nitric acid at an elevated temperature. Nicotinic acid, the other co-product of the invention, is recovered from the oxidized reaction mixture using known techniques.

My novel process is more easily understood by referring to the accompanying drawing, which is a flow sheet of an embodiment of the invention.

In the drawing, separate streams of quinoline and oleum are directed to a sulfonation zone. The sulfonated mix is continuously withdrawn therefrom and divided into two portions. To one portion water is added to precipitate, or to cause crystallization of, quinoline-8-sulfonic acid. The crystals are then separated from the mother liquor and may be washed, if desired, until the product contains no occluded acid. The washings are combined with the water used in the crystallization step. The quinoline-8-sulfonic acid is converted to 8-hydroxyquinoline by caustic treatment. The mother liquor which is separated from the crystals is concentrated and is thereafter blended with the other portion of the sulfonated mix. The blend of sulfonated quinoline is oxidized with nitric acid to make nicotinic acid.

The quinoline suitable as the starting material in the invention need not be pure. I have found that technical grade quinoline, which ordinarily contains a minor portion of isoquinoline, is quite acceptable as a reactant in my continuous sulfonation procedure.

The oleum used in the sulfonation step should contain a high concentration, preferably between about 50 and 65% by weight, of sulfur trioxide, in order to maintain the overall efficiency of my process. The sulfonation theoretically proceeds according to the reaction sequence shown hereunder in Equations 1 and 2.

(1) 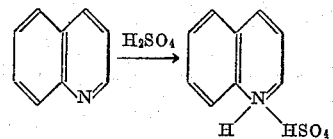

(2) 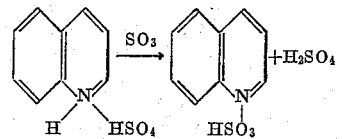

Equation 1 shows the neutralization of quinoline with sulfuric acid to form quinoline sulfate. Equation 2 shows the conversion of quinoline sulfate by sulfur trioxide to quinoline-8-sulfonic acid. It is necessary to provide a high concentration of $SO_3$ in the oleum to promote the conversion of quinoline sulfate to quinoline-8-sulfonic acid within a short period of time and to reduce to a minimum the amount of diluent sulfuric acid which must be handled at a later stage in the process.

The sulfonation step must be carried out continuously because of the high concentration of the sulfur trioxide in the oleum. When oleum of such concentration, e.g. 50–65%, is added batch-wise to quinoline a violent exothermic reaction occurs and a solid phase of quinoline sulfate is formed, thus preventing the reaction from going to completion. In a continuous operation this problem is overcome, since the large amount of heat given off in the neutralization (Equation 1) is continuously used to promote the sulfonation (Equation 2). Moreover, the continuous system contains an appreciable amount of sulfonated quinoline, which serves as an additional solvent for the quinoline sulfate.

The weight ratio of oleum to quinoline should be at least about 2:1 and preferably no more than about 3:1. Below about 2:1 the difficulties attendant the precipitation of quinoline sulfate are incurred and above about 3:1 it becomes inconvenient to handle the excess acid during the subsequent process steps.

The sulfonation temperature ranges between about 120 and 180° C. Below about 120° C. sulfonation reaction is too slow and above about 180° C., side reactions occur which result in the carbonization of quinoline and in the formation of increased amounts of polysulfonated quinoline, thus reducing the overall efficiency of the process.

The sulfonated mix is continuously removed from the sulfonation zone at a rate sufficient to provide an average residence time between about 1 and 6 hours. At least about one hour is required to complete the sulfonation and a prolonged residence time adversely effects the operation of the process from an economic standpoint. For smooth and efficient operation an average residence time of about three hours is preferred.

The relative size of the two portions into which the sulfonation mix is divided is governed by a variety of factors, including (1) the sales requirements for the co-products, (2) the amount of substantially pure quinoline-8-sulfonic acid which can be effectively separated from the mother liquor after the crystallization step, (3) the degree of concentration of the separated mother liquor required before the blending step and (4) the quantity of diluent sulfonated quinoline (concentrated mother liquor) necessary for blending with the portion of the sulfonated mix directed to nicotinic acid production in order to provide an oxidation mixture containing the proper concentration of sulfonated quinoline. Generally, I have found that the sulfonated mix should be divided into two portions containing between about 30–50 and 50–70% by weight. By dividing the mix into such portions, either portion is suitable for further processing to make either product. I prefer to use substantially equal portions, e.g. 45–50 and 50–45% by weight.

Crystallization of relatively pure quinoline-8-sulfonic acid is accomplished by adding at least an equal quantity (by weight) of water to one of the portions of the sulfonated mix. No advantage is seen in using a quantity of water greater than about three parts of water per part mix because of the expense involved during the concentration step which follows the separation of the mother liquor from the crystals. Crystallization may be conducted either continuously or batch-wise. Suitable temperatures range from 0–50° C., although a temperature of about 20–30° C. is preferred. At least about two hours is required for the crystallization.

After the crystals of quinoline-8-sulfonic acid are formed they are separated from the mother liquor by any convenient method, for example, by filtration or centrifugation. Since the crystals are relatively large, centrifugation is preferred. In the crystallization step it is possible to precipitate in the form of relatively pure large crystals about 50–70% by weight of the quinoline-8-sulfonic acid contained in the portion of sulfonation mix treated with water. If an effort is made to obtain more than 70% of the quinoline-8-sulfonic acid therefrom, the crystallization time is unduly prolonged and a considerable quantity of sulfate impurity is occluded within the crystallizate. In order to obtain reasonably pure sulfonic acid I prefer to choose crystallization conditions by which I will obtain, during the separation step, from about 60–65% of the sulfonated quinoline present in the sulfonated mix. The excess sulfuric acid and the remaining sulfonated quinoline in the mother liquor are effectively consumed in a subsequent stage in my process.

I have noted that the quinoline-8-sulfonic acid obtained by controlling the crystallization as described hereabove is relatively pure. If it is desired to remove the last traces of sulfate from the product, a washing step may be employed after the crystals are separated from the mother liquor. There is no particular limit on the number of washes and the wash water is easily combined with the water added to the sulfonated mix during the crystallization operation.

The conventional methods of making 8-hydroxyquinoline from quinoline-8-sulfonic acid involve treatment with caustic at an elevated temperature. To obtain the highest possible yields in the most efficient manner I prefer to use the method described and claimed in my copending application S.N. 847,399. Briefly stated, that method is as follows. Quinoline-8-sulfonic acid is admixed with sodium hydroxide containing a quantity of water sufficient to maintain said sodium hydroxide in a fluid state at the selected reaction temperature until the completion of the reaction, the weight ratio of said sodium hydroxide to quinoline-8-sulfonic acid being about 0.5–0.75:1. The reaction mixture is heated at a temperature of 270–320° C. in an inert atmosphere until a dry powder is formed, and 8-hydroxyquinoline is recovered in substantially pure form from said powder by neutralization and solvent extraction.

The mother liquor which is separated from the crystals of quinoline-8-sulfonic acid contains the residual sulfonated quinoline which was not removed during the crystallization step, the excess sulfuric acid which was not consumed during the sulfonation reaction and the water of dilution which was added to effect crystallization. Before the mother liquor can be used in the process it must be concentrated to a degree sufficient to provide, after it is blended with the other portion of the sulfonated mix, a solution of sulfonated quinoline in sulfuric acid containing between about 10 and 30% by weight sulfonated quinoline. If the blend contains less than about 10% by weight sulfonated quinoline, an insufficient yield of nicotinic acid is obtained after the oxidation step. If it contains greater than about 30%, side reactions occur during the oxidation step, which cause decarboxylation, thus diminishing the yield of nicotinic acid. Prior to the blending operation the sulfonated mix contains about 35–45% by weight sulfonated quinoline. I have found that if the mother liquor is concentrated to the point at which up to about 15% by weight of free water remains in the concentrate the concentrate will be of a strength to provide, after blending, an acidic solution containing the proper concentration of sulfonated quinoline for the oxidation step. It is preferred to remove substantially all of the free water during the concentration step.

Concentration is conveniently accomplished by distillation at atmospheric or at sub-atmospheric pressures. Using atmospheric pressure a distillation at a temperature of about 200–230° C. is required. I have found it more convenient to work at somewhat lower temperatures, for example, 135–175° C. using a vacuum of from about 100–200 mm. of Hg. High vacuum distillation, e.g. at 5–10 mm. of Hg, is effective, but obviously this technique is more expensive and therefore not preferred.

After the blending step, the solution of sulfonated quinoline and sulfuric acid is oxidized using any known procedure to make nicotinic acid. I prefer to accomplish the oxidation with concentrated nitric acid, e.g. 50–70% by weight, at a temperature of about 225–275° C. After the oxidation is complete, the reaction mixture is neutralized with caustic in the conventional manner to precipitate sodium sulfate and to form the sodium salt of nicotinic acid. The reaction mixture is filtered and the filtrate containing the sodium nicotinate is treated with a stoichiometric quantity of a mineral acid, such as sulfuric acid, to precipitate free nicotinic acid. The precipitated nicotinic acid is separated and dried. Highly pure nicotinic acid can be obtained conveniently by sublimation of the crude product as described in my copending application S.N. 735,551, now U.S. Patent 2,916,494.

My invention is further illustrated by the following examples.

*Example I*

A feed stream of 2° quinoline (quinoline having a distillation range of 2° C., containing about 90–96% pure quinoline) was added continuously to a reactor at a rate of 3.03 pounds per hour. A stream of 65% oleum was simultaneously added at a rate of 6.27 pounds per hour. The temperature of the reaction mixture was maintained at about 140–150° C. and sulfonated mix was withdrawn from the reactor after a three-hour residence time at a rate of 9.30 pounds per hour. The sulfonated mix was divided into two streams; 4.30 pounds per hour being directed to nicotinic acid production and the remaining 5.00 pounds per hour being directed to the production of 8-hydroxyquinoline.

To 5 pounds of sulfonated mix was added 5.43 pounds of water. The mixture was allowed to cool and was held at 25–30° C. for four hours, thereby precipitating quinoline-8-sulfonic acid. The precipitated crystals were separated by filtration and 8.39 pounds of filtrate was obtained. 1.87 pounds of water was drawn continuously through the bed of crystals to remove any residual sulfuric acid therefrom. The washings (1.81 pounds) were combined with 3.62 pounds of water for use in a subsequent crystallization. 1.79 pounds of relatively pure wet quinoline sulfonic acid (1.72 pounds dry) was thereby obtained.

The quinoline-8-sulfonic acid was mixed with 1.69 pounds of 70% NaOH and heated for 15–20 minutes at a temperature of about 290–315° C. under an atmosphere of dry steam. The product thus obtained was drowned in 5.68 pounds of water. It was then neutralized with 0.66 pound of 66° Baumé sulfuric acid. Toluene was added to the neutralized mixture and the pH of the mix was adjusted to 8. The mixture was held at 25–45° C. for about four hours. The aqueous layer (7.80 pounds) was decanted therefrom and 6.51 pounds of toluene extract was subjected to distillation. 5.43 pounds of toluene was distilled off at 110° C. and one pound of product, representing 99.5% pure 8-hydroxyquinoline (84% yield based on the available quinoline-8-sulfonic acid) was distilled off at 126° C. under 10 mm. Hg pressure.

The filtrate from the separation step (8.39 pounds) was subjected to distillation at 150° C. under a pressure of 200 mm. of Hg. The 3.92 pounds of sulfonated residue thus obtained was thereafter blended with the 4.30 pound portion of sulfonated mix to form 8.22 pounds of a solution of sulfonated quinoline in sulfuric acid. The solution contained 23.6% by weight sulfonated quinoline. It was converted to nicotinic acid by oxidation at 250–270° C. with 12.7 pounds of 60% nitric acid over a period of four hours. The oxidized mixture (7.2 pounds) was a clear solution of nicotinic acid sulfate in sulfuric acid. Nicotinic acid was recovered by fractional precipitation with 50% sodium hydroxide. The yield of crude nicotinic acid was 1.6 pounds. This crude product was sublimed and then recrystallized from about 15 pounds of water to yield 1.47 pounds of nicotinic acid of U.S.P. grade (80% yield based on the available quinoline).

*Example II*

As in Example I a feed stream of 2° quinoline was added continuously to a reactor at a rate of 3.03 pounds per hour. A stream of 65% oleum was simultaneously added at a rate of 5.02 pounds per hour rather than at the 6.27 pounds per hour used in Example I. The temperature of the reaction mixture was maintained at about 140–150° C. and sulfonated mix was withdrawn from the reactor after a three hour average residence time at a rate of 8.05 pounds per hour. After two hours of continuous operation, the reaction equipment became clogged with solids and no flow could be maintained. The experiment was abandoned.

*Example III*

As in Example I a stream of 2° quinoline was added continuously to a reactor at a rate of 3.03 pounds per hour. A stream of 65% oleum was simultaneously added at a rate of 6.27 pounds per hour. The temperature of the reaction mixture was maintained at about 100–110° C. and sulfonated mix was withdrawn from the reactor after a three hour residence time at a rate of 9.30 pounds per hour. The sulfonated mix was then divided into two streams and processed as in Example I. The yield of dry quinoline-8-sulfonic acid was 1.34 pounds. The yield of U.S.P. grade nicotinic acid was 1.18 pounds.

*Example IV*

As in Example I a stream of 2° quinoline was added continuously to a reactor at a rate of 3.03 pounds per hour. A stream of 30% oleum was simultaneously added at a rate of 9.36 pounds per hour. The temperature of the reaction mixture was maintained at about 140° C. and sulfonated mix was withdrawn from the reactor after a three hour average residence time at a rate of 12.39 pounds per hour. The sulfonated mix was worked up for quinoline-8-sulfonic acid by precipitation with 13.5 parts of water. The yield of quinoline-8-sulfonic acid was only 1.0 pound. The experiment was discontinued.

*Example V*

Continuous sulfonation of 2° quinoline was carried out as in Example I. The sulfonated mix was similarly divided into two streams; 4.30 pounds being directed to nicotinic acid production and the remaining 5.00 pounds being directed to the production of 8-hydroxyquinoline.

To 5.00 pounds of the sulfonated mix was added 3.00 pounds of water. The mixture was cooled and subsequently processed as in Example I. 1.47 pounds of relatively pure wet quinoline-8-sulfonic acid (1.41 pounds dry) was thereby recovered. The experiment was discontinued at this point.

I claim:

1. An integrated method for making nicotinic acid and 8-hydroxyquinoline comprising continuously supplying a feed of quinoline and oleum of high SO₃ concentration to a reaction zone, the weight ratio of oleum to quinoline being from 2:1 to 3:1, maintaining said reaction zone at a temperature of 120–180° C., continuously withdrawing from said zone a sulfonated mix comprising a solution of sulfonated quinoline in sulfuric acid at a rate sufficient to provide an average residence time for said feed in said zone of 1–6 hours, dividing said sulfonated mix into two portions representing from 30–50% and 50–70% by weight of said mix, adding to one of said portions a quantity of water at least equal to the weight thereof, thereby precipitating quinoline-8-sulfonic acid therefrom, separating said quinoline-8-sulfonic acid from its mother liquor, treating said quinoline-8-sulfonic acid with sodium hydroxide at an elevated temperature to form the sodium salt of 8-hydroxyquinoline, recovering 8-hydroxyquinoline from said salt, concentrating said mother liquor, blending the concentrate with the other of said portions of said mix to form a solution of sulfonated quinoline in sulfuric acid having therein between 10–30% by weight sulfonated quinoline, oxidizing the blend with nitric acid at an elevated temperature and recovering nicotinic acid from the oxidized reaction mixture.

2. An integrated method for making nicotinic acid and 8-hydroxyquinoline comprising continuously supplying a feed of quinoline and oleum having a $SO_3$ content of 50–65% to a reaction zone, the weight ratio of oleum to quinoline being from 2:1 to 3:1, maintaining said reaction zone at a temperature of 120–180° C., continuously withdrawing from said zone a sulfonated mix comprising a solution of sulfonated quinoline in sulfuric acid at a rate sufficient to provide an average residence time for said feed in said zone of 1–6 hours, dividing said sulfonated mix into two portions representing from 30–50% and 50–70% by weight of said mix, adding to one of said portions a quantity of water at least equal to the weight thereof, thereby precipitating quinoline-8-sulfonic acid therefrom, separating said quinoline-8-sulfonic acid from its mother liquor, treating said quinoline-8-sulfonic acid with sodium hydroxide at an elevated temperature to form the sodium salt of 8-hydroxyquinoline, recovering 8-hydroxyquinoline from said salt, concentrating said mother liquor to the extent wherein only up to 15% of the free water remains therein, blending the concentrate with the other of said portions of said mix to form a solution of sulfonated quinoline in sulfuric acid having therein between 10–30% by weight sulfonated quinoline, oxidizing the blend with nitric acid at an elevated temperature and recovering nicotinic acid from the oxidized reaction mixture.

3. An integrated method for making nicotinic acid and 8-hydroxyquinoline comprising continuously supplying a feed of quinoline and oleum having an $SO_3$ content of 50–65% to a reaction zone, the weight ratio of oleum to quinoline being 2–3:1, maintaining said reaction zone at a temperature of 120–180° C., continuously withdrawing from said zone a sulfonated mix comprising a solution of sulfonated quinoline in sulfuric acid at a rate sufficient to provide an average residence time for said feed in said zone of about 3 hours, dividing said sulfonated mix into two portions representing from 45–50% and 40–45% by weight of said mix, adding to one of said portions a quantity of water at least equal to the weight thereof, thereby precipitating quinoline-8-sulfonic acid therefrom, separating said quinoline-8-sulfonic acid from its mother liquor, treating said quinoline-8-sulfonic acid with sodium hydroxide at elevated temperature to form the sodium salt of 8-hydroxyquinoline, recovering 8-hydroxyquinoline from said salt, concentrating said mother liquor, blending the concentrate with the other of said portions of said mix to form a solution of sulfonated quinoline in sulfuric acid having therein between 10–30% by weight sulfonated quinoline, oxidizing the blend with nitric acid at an elevated temperature and recovering nicotinic acid from the oxidized reaction mixture.

References Cited in the file of this patent

UNITED STATES PATENTS

| | | |
|---|---|---|
| 2,489,530 | Grier | Nov. 29, 1949 |
| 2,522,163 | Cislak et al. | Sept. 12, 1950 |
| 2,689,850 | Grier | Sept. 21, 1954 |

FOREIGN PATENTS

| | | |
|---|---|---|
| 912,216 | Germany | May 28, 1954 |

UNITED STATES PATENT OFFICE
CERTIFICATE OF CORRECTION

Patent No. 2,999,094 September 5, 1961

John O'Brochta

It is hereby certified that error appears in the above numbered patent requiring correction and that the said Letters Patent should read as corrected below.

Column 8, line 10, for "40-45%" read -- 50-45% --.

Signed and sealed this 24th day of April 1962.

(SEAL)
Attest:

ESTON G. JOHNSON
Attesting Officer

DAVID L. LADD
Commissioner of Patents